United States Patent
Zhang et al.

(10) Patent No.: US 11,892,723 B2
(45) Date of Patent: Feb. 6, 2024

(54) ELECTRONIC DEVICE AND DRIVING METHOD THEREFOR

(71) Applicant: JRD COMMUNICATION (SHENZHEN) LTD., Guangdong (CN)

(72) Inventors: Junjie Zhang, Guangdong (CN); Zhiwen Sun, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 0 days.

(21) Appl. No.: 17/995,257

(22) PCT Filed: May 11, 2020

(86) PCT No.: PCT/CN2020/089624
§ 371 (c)(1),
(2) Date: Sep. 30, 2022

(87) PCT Pub. No.: WO2021/203512
PCT Pub. Date: Oct. 14, 2021

(65) Prior Publication Data
US 2023/0176415 A1    Jun. 8, 2023

(30) Foreign Application Priority Data
Apr. 7, 2020  (CN) .......................... 202010265472.5

(51) Int. Cl.
*G06F 3/041* (2006.01)
*G02F 1/1335* (2006.01)
*G09G 3/36* (2006.01)

(52) U.S. Cl.
CPC ......... *G02F 1/133512* (2013.01); *G09G 3/36* (2013.01); *G09G 2320/0626* (2013.01); *G09G 2330/021* (2013.01); *G09G 2354/00* (2013.01)

(58) Field of Classification Search
CPC ...... G06F 3/04164; G06F 1/16; G06F 3/0412; G06F 3/0416; G06F 3/0418; G06F 3/044;
(Continued)

(56) References Cited

U.S. PATENT DOCUMENTS

2013/0050619 A1* 2/2013 Kim ..................... G02F 1/13394
430/320
2017/0299918 A1* 10/2017 Yu ....................... H01L 27/1218

FOREIGN PATENT DOCUMENTS

CN    108885376 A    11/2018
CN    109856850 A     6/2019
(Continued)

OTHER PUBLICATIONS

International Search Report in International application No. PCT/CN2020/089624, dated Jan. 18, 2021.
(Continued)

*Primary Examiner* — Pegeman Karimi
(74) *Attorney, Agent, or Firm* — PV IP PC; Wei Te Chung; Zhigang Ma (57) ABSTRACT

An electronic device and a driving method therefor. Thicknesses of color resist and a black matrix in a first area, at a corresponding position of a light-transmitting area, of a color film substrate are smaller than the thicknesses of color resist and a black matrix outside the first area, a backlight module is defined with a through hole corresponding to the light-transmitting area, and a photographing module (30) is disposed corresponding to the through hole, so that external light rays can be obtained by means of the through hole and the light-transmitting area, thus under-screen photographing is achieved, and 100% full-screen design is satisfied.

17 Claims, 3 Drawing Sheets

(58) Field of Classification Search
CPC ......... G06F 3/0446; G06F 2203/04102; G06F 2203/04103; G06F 2203/04107; G06F 2203/04111; G02F 1/133345; G02F 1/13338; G02F 1/13439; H05K 1/0216; H05K 1/11; H05K 1/118; H05K 3/361; H05K 2201/09245; H05K 2201/09254
See application file for complete search history.

(56) References Cited

FOREIGN PATENT DOCUMENTS

| | | | | |
|---|---|---|---|---|
| CN | 110010666 A | 7/2019 | | |
| CN | 110471211 | * 11/2019 | ........... | G02F 1/1333 |
| CN | 110471211 A | 11/2019 | | |
| CN | 110579898 A | 12/2019 | | |
| CN | 110646984 A | 1/2020 | | |
| CN | 110716340 A | 1/2020 | | |
| CN | 110888261 A | 3/2020 | | |
| JP | 4728793 B2 | 7/2011 | | |

OTHER PUBLICATIONS

Written Opinion of the International Search Authority in International application No. PCT/CN2020/089624, dated Jan. 18, 2021.
Chinese Office Action issued in corresponding Patent Application No. 202010265472.5 dated Dec. 25, 2020, pp. 1-9.

* cited by examiner

FIG. 1

21 — prohibiting power supply to a microelectronic circuit in the second area by a driver chip in a liquid crystal module of the electronic device when a photographing module of the electronic device is called for shooting, wherein a position of a second area on an array substrate in the liquid crystal module is corresponding to a light-transmitting area in the liquid crystal module 22 — allowing power supply to the microelectronic circuit in the second area by the driver chip when the photographing module is not called for shooting, the power supply of the microelectronic circuit in the second area is consistent with power supply of microelectronic circuit outside the second area

ELECTRONIC DEVICE AND DRIVING METHOD THEREFOR

CROSS-REFERENCE TO RELATED APPLICATIONS

The present application is a US national phase application based upon an International Application No. PCT/CN2020/089624, filed on May 11, 2020, which claims priority to Chinese application No. 202010265472.5, filed on Apr. 7, 2020, titled "ELECTRONIC DEVICE AND DRIVING METHOD THEREFOR", which is incorporated by reference in the present application in its entirety.

FIELD OF INVENTION

The present application relates to a field of electronic equipment, and especially to an electronic device and a driving method therefor.

BACKGROUND OF INVENTION

In order to realize a selfie function, a front camera is always disposed on a screen, but if the front camera is disposed on the screen, it is impossible for a mobile phone to achieve 100% full screen ratio. Therefore, a full screen technology and a photography technology including the front camera are main driving forces of technology competition of mobile phone manufacturers at present stage. Generally speaking, the larger a ratio of a display area of a mobile phone screen to a front of the whole mobile phone is, the better a performance of the front camera, and more popular the mobile phone is with consumers. However, due to a functional difference between the front camera and a display screen, presence of the front camera will occupy a part of a front area of the mobile phone, which reduces the display area, that is, the screen ratio of the mobile phone is reduced. Regarding this issue, a solution is to hide the front camera inside the mobile phone itself through a lifting mechanical structure to avoid the front camera from occupying the display area. Another solution is that the mobile phone is set as a sliding cover, and the front camera is placed on a behind half of the mobile phone, which can also avoid the front camera from occupying the front area of the mobile phone.

However, both the above two solutions to increase the screen ratio of the mobile phone have some disadvantages. For example, the front camera is set to the lifting structure, that is, it pops up when it is in use, and is stored in a cabin of the mobile phone when it is not in use. However, such mobile phone has a complex structure, high processing difficulty, high manufacturing cost, low reliability of an action of the front camera, and problems of frequent popping up easily lead to bumping damage to the front camera. The sliding type will lead to an increase in a thickness and volume of the mobile phone. In addition, the above two solutions cause a large gap on the mobile phone, water and dust can easily enter the gap, thereby affecting quality of the mobile phone.

SUMMARY OF INVENTION

Embodiments of the present application provide an electronic device and a driving method therefor, so as to solve a problem that a 100% full screen cannot be realized.

According to a first aspect of the present application, the present application provides an electronic device, comprises: a liquid crystal module, having a light-transmitting area, the liquid crystal module comprising an upper polarizer, a color film substrate, a liquid crystal layer, an array substrate, and a lower polarizer from a top to a bottom insequence, wherein thicknesses of color resist and a black matrix in a first area, at a corresponding position of the light-transmitting area, of the color film substrate are lower than thicknesses of color resist and a black matrix outside the first area, the thicknesses of the color resist and the black matrix of the first area is 10% to 60% of the thicknesses of the color resist and the black matrix outside the first area, a second area is disposed on the array substrate at a corresponding position of the light-transmitting area, and an area of the second area is smaller than an area of the first area and larger than an area of a through hole; a backlight module, disposed below the liquid crystal module, the backlight module is provided with the through hole corresponding to the light-transmitting area; and a photographing module, disposed below the backlight module, the photographing module is disposed corresponding to the through hole, so that external light rays can be obtained by means of the through hole and the light-transmitting area.

Further, the area of the second area is determined by a shooting angle of the photographing module and a size of an exposed lens.

Further, the area of the first area is determined by a shooting angle of the photographing module and a size of an exposed lens.

Further, the area of the through hole is determined by a shooting angle of the photographing module and a size of an exposed lens.

Further, the electronic device further comprises a driver chip, and the driver chip is configured to prohibit power supply to a microelectronic circuit in the second area when the photographing module of the electronic device is called for shooting.

Further, the driver chip is further configured to allow power supply to the microelectronic circuit in the second area when the photographing module is not called for shooting, the power supply to the microelectronic circuit in the second area is consistent with power supply to microelectronic circuit outside the second area.

According to a second aspect of the present application, the present application provides an electronic device, comprises: a liquid crystal module, having a light-transmitting area, the liquid crystal module comprising an upper polarizer, a color film substrate, a liquid crystal layer, an array substrate, and a lower polarizer from a top to a bottom insequence, wherein thicknesses of color resist and a black matrix in a first area, at a corresponding position of the light-transmitting area, of the color film substrate are lower than thicknesses of color resist and a black matrix outside the first area; a backlight module, disposed below the liquid crystal module, the backlight module is provided with a through hole corresponding to the light-transmitting area; and a photographing module, disposed below the backlight module, the photographing module is disposed corresponding to the through hole, so that external light rays can be obtained by means of the through hole and the light-transmitting area.

Further, a second area is disposed on the array substrate at a corresponding position of the light-transmitting area, and an area of the second area is smaller than an area of the first area and larger than an area of the through hole.

Further, the area of the second area is determined by a shooting angle of the photographing module and a size of an exposed lens.

Further, the area of the first area is determined by a shooting angle of the photographing module and a size of an exposed lens.

Further, the area of the through hole is determined by a shooting angle of the photographing module and a size of an exposed lens.

Further, the thicknesses of the color resist and the black matrix of the first area is 10% to 60% of the thicknesses of the color resist and the black matrix outside the first area.

Further, the electronic device further comprises a driver chip, and the driver chip is configured to prohibit power supply to a microelectronic circuit in the second area when the photographing module of the electronic device is called for shooting.

Further, the driver chip is further configured to allow power supply to the microelectronic circuit in the second area when the photographing module is not called for shooting, the power supply to the microelectronic circuit in the second area is consistent with power supply to microelectronic circuit outside the second area.

According to a third aspect of the present application, the present application provides a driving method using the above-mentioned electronic device, the method comprises: prohibiting power supply to a microelectronic circuit in a second area by a driver chip in the liquid crystal module of the electronic device when the photographing module of the electronic device is called for shooting, wherein a position of the second area on the array substrate in the liquid crystal module is corresponding to the light-transmitting area in the liquid crystal module; and allowing power supply to the microelectronic circuit in the second area by the driver chip when the photographing module is not called for shooting, the power supply to the microelectronic circuit in the second area is consistent with power supply to microelectronic circuit outside the second area.

Further, measuring voltages on an upper side and a lower side of the liquid crystal molecules at positions of the liquid crystal layer in the liquid crystal module corresponding to the light-transmitting area when the photographing module is called for shooting, and obtain that the voltages are zero; and measuring the voltages on the upper side and the lower side of the liquid crystal molecules at the positions of the liquid crystal layer corresponding to the light-transmitting area when the photographing module is not called for shooting, and obtain that the voltages are not equal to zero.

Compared with an existing technology, the electronic device and the driving method therefor provided by the present application, the thicknesses of the color resist and the black matrix in the first area, at the corresponding position of a light-transmitting area, of the color film substrate are smaller than the thicknesses of the color resist and the black matrix outside the first area, and the backlight module is provided with the through hole corresponding to the light-transmitting area, the photographing module is disposed corresponding to the through hole, so that the external light rays can be obtained, thus under-screen photographing is achieved, and 100% full-screen design is satisfied.

DETAILED DESCRIPTION OF PREFERRED EMBODIMENTS

Technical solutions in embodiments of the present application will be clearly and completely described below with reference to the accompanying drawings in the embodiments of the present application. Obviously, the described embodiments are only parts of the embodiments of the present application, but not all of the embodiments. Based on the embodiments in the present application, all other embodiments obtained by those skilled in the art without creative work fall within protection scope of the present application.

Terms "first", "second", "third", etc. (if exist) in the description and claims of the present application and the above-mentioned figures are used to distinguish similar objects and are not necessarily used to describe a particular order or sequence. It is to be understood that the objects as described are interchangeable under appropriate circumstances. Furthermore, terms "comprising" and "having", and any variations thereof, are intended to cover non-exclusive inclusion.

In the detailed description, the drawings discussed below and the embodiments used to describe the principles of the present disclosure are by way of illustration only and should not be construed as limiting the scope of the present disclosure. Those skilled in the art will understand that the principles of the present application may be implemented in any suitably arranged system. Exemplary embodiments will be described in detail, examples of which are illustrated in the accompanying drawings. Also, a terminal according to an exemplary embodiment will be described in detail with reference to the accompanying drawings. The same reference numbers in the figures refer to the same elements. The same reference numbers in the figures refer to the same elements.

The terms used in this detailed description are used to describe a particular embodiment only, and are not intended to convey the concepts of the present application. Expressions used in the singular cover expressions in the plural unless the context clearly indicates a different meaning. In the specification of the present application, it should be understood that terms such as "comprising", "having" and "containing" are intended to indicate the existence of the possibility of the features, numbers, steps, actions or combinations thereof disclosed in the specification of the present application, and are not intended to be the possibility that one or more other features, numbers, steps, actions, or combinations thereof may be present or may be added is excluded. The same reference numbers in the drawings refer to the same parts.

Figure 1:
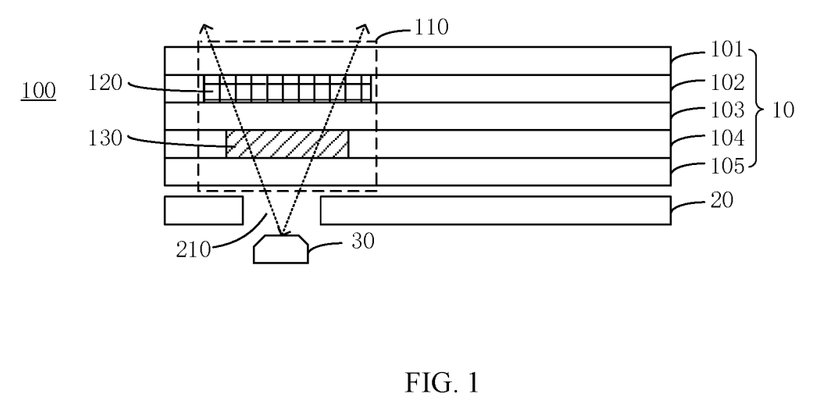
FIG. 1 is a schematic structural diagram of an electronic device provided by an embodiment of the present application.

As shown in FIG. 1, the present application provides an electronic device 100, comprising: a liquid crystal module 10, an upper polarizer 101, a color film substrate 102, a liquid crystal layer 103, an array substrate 104, a lower polarizer 105, a light-transmitting area 110, a first area 120, a second area 130, a backlight module 20, a through hole 210, and a photographing module 30.

The liquid crystal module 10 is provided with the light-transmitting area 110. The liquid crystal module 10 comprises the upper polarizer 101, the color filter substrate 102, the liquid crystal layer 103, the array substrate 104, and the lower polarizer 105 from a top to a bottom in sequence.

In an embodiment of the present application, the color filter substrate 102 is provided with the first area 120 at a position corresponding to the light-transmitting area 110, and an area of the first area 120 is determined by a shooting angle of the photographing module 30 and a size of an exposed lens. Wherein thicknesses of color resist and a black matrix in the first area 120 are lower than thicknesses of color resist and a black matrix outside the first area; specifically, the thicknesses of the color resist and the black matrix of the first area 120 is 10% to 60% of the thicknesses of the color resist and the black matrix outside the first area 120, thus, light transmittance is increased, so that the photographing module obtains external light rays when shooting, and an image is clearer.

In the embodiment of the present application, the second area 130 is disposed on the array substrate 104 at a corresponding position of the light-transmitting area 110, an area of the second area 130 is determined by the shooting angle of the photographing module 30 and the size of the exposed lens. Microelectronic circuits in the second area 130 are individually controlled by a driver chip. Specifically, the driver chip is configured to prohibit power supply to the microelectronic circuit in the second area 130 when the photographing module of the electronic device is called for shooting. At this time, voltages on an upper side and a lower side of liquid crystal molecules at positions corresponding to the light-transmitting area 110 of the liquid crystal layer 103 are zero. The liquid crystal molecules do not twist, which facilitates a light input amount of the photographing module 30 and improves a quality of the image during shooting. The driver chip is also used to allow power supply to the microelectronic circuit in the second area 130 when the photographing module 30 is not called for shooting, the power supply of the microelectronic circuit in the second area 130 is consistent with power supply of microelectronic circuit outside the second area. At this time, the voltages on the upper side and the lower side of the liquid crystal molecules at positions corresponding to the light-transmitting area 110 of the liquid crystal layer 103 are not zero, and the liquid crystal molecules are twisted, which facilitates display effect of the electronic device when not shooting.

The backlight module 20 is disposed below the liquid crystal module 10. The backlight module 20 is defined with a through hole 210 corresponding to the light-transmitting area 110. An area of the through hole 210 is determined by the shooting angle of the photographing module 30 and the size of the exposed lens. The through hole 210 is used for the photographing module 30 to obtain external light rays.

The photographing module 30 is disposed below the backlight module 20. The photographing module 30 is disposed corresponding to the through hole 210, so that external light rays can be obtained by means of the through hole 210 and the light-transmitting area 110. According to a position arrangement of the photographing module 30 of the present application, the photographing module 30 is disposed under the display screen to achieve 100% full-screen display, and due to arrangements of the backlight module and the liquid crystal module, when the photographing module is called for shooting, there is enough light rays to make the image clear.

In the present application, the thicknesses of the color resist and the black matrix in the first area, at the corresponding position of the light-transmitting area, of the color film substrate are smaller than the thicknesses of the color resist and the black matrix outside the first area, and the backlight module is defined with the through hole corresponding to the light-transmitting area, the photographing module is disposed corresponding to the through hole, so that external light rays can be obtained, thus under-screen photographing is achieved, and 100% full-screen design is satisfied.

Figure 2:
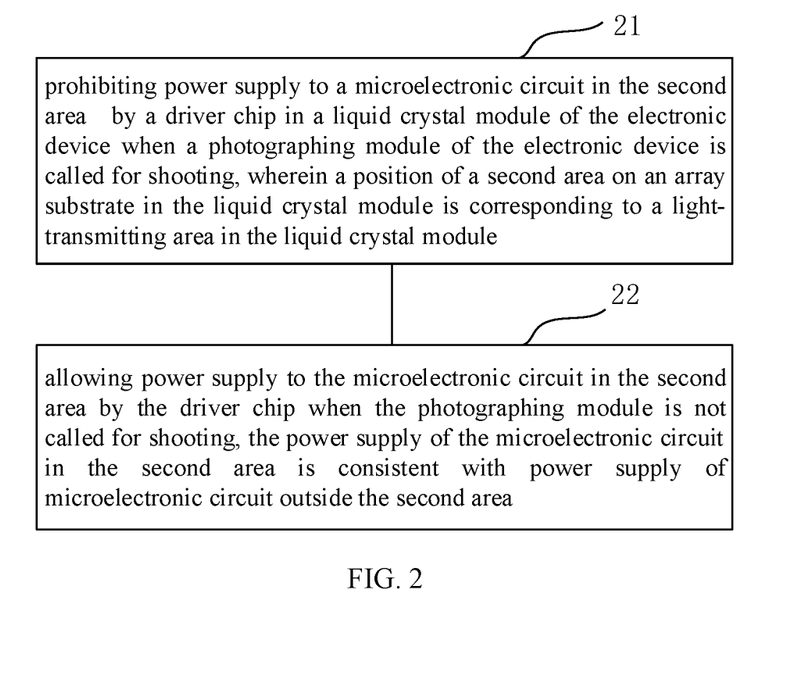
FIG. 2 is a schematic flowchart of steps of a driving method for the electronic device provided by an embodiment of the present application.

As shown in FIG. 2, the present application provides a driving method for an electronic device, which specifically comprises the following steps.

Step S21, prohibiting power supply to a microelectronic circuit in the second area by a driver chip in a liquid crystal module of the electronic device when a photographing module of the electronic device is called for shooting, wherein a position of a second area on an array substrate in the liquid crystal module is corresponding to a light-transmitting area in the liquid crystal module.

In the embodiment of the present application, when the photographing module is called for shooting, voltages on an upper side and a lower side of the liquid crystal molecules at positions corresponding to the light-transmitting area of the liquid crystal layer of the liquid crystal module are measured, and the voltages are zero. Liquid crystal molecules do not twist, which facilitates a light input amount of the photographing module 30 and improves a quality of an image during shooting.

Step S22, allowing power supply to the microelectronic circuit in the second area by the driver chip when the photographing module is not called for shooting, the power supply of the microelectronic circuit in the second area is consistent with power supply of microelectronic circuit outside the second area.

In the embodiment of the present application, when the photographing module is not called for shooting, the voltages on the upper side and the lower side of the liquid crystal molecules at the positions of the liquid crystal layer corresponding to the light-transmitting area are measured, and the voltages are not equal to zero. At this time, the liquid crystal molecules are twisted, which facilitates display effect of the electronic device when not shooting.

Those of ordinary skill in the art can understand that all or part of the steps in the various methods of the above embodiment can be completed by instructions, or completed by instructions that control relevant hardware, and the instructions can be stored in a computer-readable storage medium, and is loaded and executed by a processor. Therefore, the embodiment of the present application provides a storage medium in which a plurality of instructions are stored, and the instructions can be loaded by the processor to execute steps in any driving method for the electronic device provided by the embodiment of the present application.

Wherein, the storage medium may comprise: read-only memory (ROM), random-access memory (RAM), magnetic disk, or optical disk, and so on.

Figure 3:
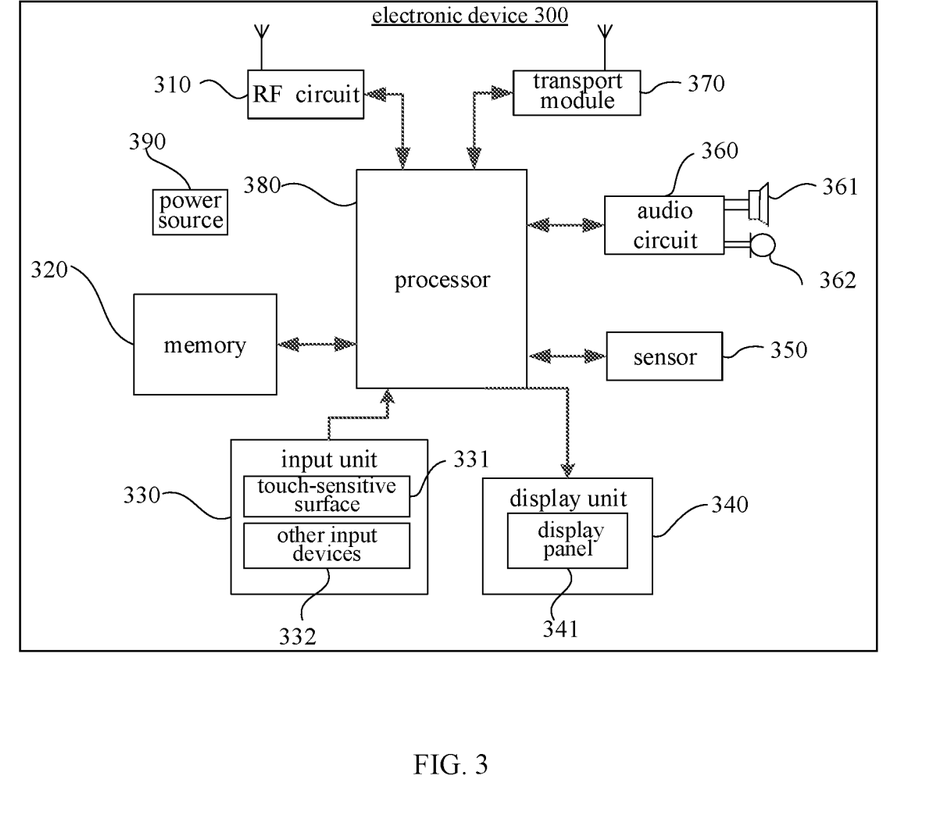
FIG. 3 is a specific schematic structure diagram of the electronic device provided by an embodiment of the present application.

As shown in FIG. 3, it is a specific structure of an electronic device 300 provided in an embodiment of the present application, the electronic device 300 may be a device such as a smartphone, a tablet computer, or the like. The electronic device also comprises following components.

An RF circuit 310 is used for receiving and sending electromagnetic waves to realize mutual conversion between electromagnetic waves and electrical signals, so as to communicate with a communication network or other devices. The RF circuit 310 may comprise various existing circuit elements for performing these functions, for example, antennas, radio frequency transceivers, digital signal processors, encryption/decryption chips, subscriber identity module (SIM) cards, memory, and the like. The RF circuit 310 may communicate with various networks such as the Internet, an intranet, a wireless network, or with other devices over a wireless network. The aforementioned wireless network may comprise a cellular telephone network, a wireless local area network, or a metropolitan area network. The aforementioned wireless network can use various communication standards, protocols, and technologies, comprising but not limited to Global System for Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi) (such as IEEE 802.11a, IEEE 802.11b, IEEE802.11g and/or IEEE 802.11n), Voice over Internet Protocol (VoIP), Worldwide Interoperability for Microwave Access (Wi-Max), other protocols for mail, instant messaging, short messaging, and any other suitable communication protocols, even those are not currently developed.

A memory 320 may be used to store software programs, and a processor 380 executes various functional applications and data processing by running software programs and modules stored in the memory 320. The memory 320 may comprise high-speed random-access memory, and may also comprise non-volatile memory, such as one or more magnetic storage devices, flash memory, or other non-volatile solid-state memory. In some embodiments, the memory 320 may further comprise memories located remotely from the processor 380, and these remote memories may be connected to the electronic device 300 through a network. Examples of such networks comprise, but are not limited to, the Internet, the intranet, the local area network, the mobile communication network, and combinations thereof.

Input unit 330 may be used to receive input numerical or character information, and to generate signal inputs of keyboard, mouse, joystick, optical, or trackball related to user settings and function control. Specifically, the input unit 330 may comprise a touch-sensitive surface 331 and other input devices 332. The touch-sensitive surface 331, also known as a touch display screen or touchpad, may collect touch operations thereon or nearby by a user (such as operations by the user to use fingers, stylus, and any suitable objects or accessories on or nearby the touch-sensitive surface 331) and drive corresponding connection devices according to a preset program. Optionally, the touch-sensitive surface 331 may comprise two portions, a touch detection device and a touch controller. Wherein, the touch detection device detects user's touch orientation and detects signals brought by the touch operations, and transmits the signals to the touch controller; the touch controller receives touch information from the touch detection device, and converts it into contact coordinates, and then sends it to the processor 380, and can receive commands sent by the processor 380 and execute it. In addition, the touch-sensitive surface 331 may be implemented using various types of resistive, capacitive, infrared, and surface acoustic waves. Apart from the touch-sensitive surface 331, the input unit 330 may also comprise other input devices 332. Specifically, the other input devices 332 may comprise, but are not limited to, one or more of physical keyboards, function keys (such as volume control keys, switch keys, etc.), trackballs, mice, joysticks, and the like.

A display unit 340 may be used to display information input by or provided to the user and various graphical user interfaces of the electronic device 300, which may be consisted of graphics, text, icons, videos, and any combination thereof. The display unit 340 may comprise a display panel 341, optionally, the display panel 341 may be configured of a liquid crystal display (LCD), an organic light-emitting diode (OLED), and the like. Further, the touch-sensitive surface 331 may cover the display panel 341, when the touch-sensitive surface 331 detects the touch operations thereon or nearby, and transmits it to the processor 380 to determine a type of a touch event, and then the processor 380 provides a corresponding visual output on the display panel 341 according to the type of the touch event. In FIG. 3, although the touch-sensitive surface 331 and the display panel 341 are used as two separate components to realize input and output functions, in some embodiments, the touch-sensitive surface 331 and the display panel 341 may be integrated to realize the input and output functions.

The electronic device 300 may also comprise at least one type of sensor 350, such as a light sensor, a motion sensor, and other sensors. Specifically, the light sensor may comprise an ambient light sensor and a proximity sensor, wherein the ambient light sensor may adjust brightness of the display panel 341 according to brightness of ambient light rays, and the proximity sensor may turn off the display panel 341 and/or backlight when the electronic device 300 is moved near an ear. As a type of motion sensor, a gravitational acceleration sensor can detect magnitude of acceleration in all directions (usually three axes), and can detect the magnitude and direction of gravity when it is stationary, which can be used to recognize applications of mobile phone postures (such as horizontal and vertical screen switching, related games, magnetometer posture calibration), vibration recognition related functions (such as pedometer, tapping), and the like. As for other sensors, such as a gyroscope, a barometer, a hygrometer, a thermometer, an infrared sensor, etc., that can also be configured in the electronic device 300, details are not described here.

An audio circuit 360, a speaker 361, and a microphone 362 may provide an audio interface between the user and the electronic device 300. The audio circuit 360 can transmit electrical signal converted from received audio data to the speaker 361, and the speaker 361 converts it into a sound signal and outputs it; on the other hand, the microphone 362 converts collected sound signal into an electrical signal, which is received by the audio circuit 360 and converted it into audio data, and then the audio data is processed by the output processor 380 and sent to, for example, another terminal through an antenna device 310, or the audio data is output to the memory 320 for further processing. The audio circuit 360 may also comprise a headphone jack to provide communication between a peripheral headphone and the electronic device 300.

The processor 380 is a control center of the electronic device 300, and uses various interfaces and lines to connect various components of an entire mobile phone, by running or executing software programs and/or modules stored in the memory 320, and calling the data stored in the memory 320 to perform various functions of the electronic device 300 and process data, so as to monitor the mobile phone as a whole. Optionally, the processor 380 may comprise one or more processing cores; in some embodiments, the processor 380 may integrate an application processor and a modem processor, wherein the application processor mainly handles an operating system, a user interface, and application programs, and so on, and the modem processor mainly deals with wireless communication. It can be understood that the above-mentioned modem processor may also not be integrated into the processor 380.

The electronic device 300 also comprises a power source 390 (such as a battery) for powering supply to the various components. In some embodiments, the power source may be logically connected to the processor 380 through a power management system to manage charging, discharging, power consumption management, and other functions through the power management system. The power source 390 may also comprise one or more DC or AC power sources, recharging systems, power failure detection circuits, power converters or inverters, power status indicators, and any other components.

Although not shown, the electronic device 300 may further comprise a camera (e.g., a front-facing camera, a rear-facing camera), a BLUETOOTH module, and the like, which will not be repeated here. The electronic device 300 further comprises a transport module 370.

During specific implementation, the above modules can be implemented as independent entities, or can be arbitrarily combined to be implemented as a same or several entities. The specific implementation of the above modules can refer to the previous method embodiments, which will not be repeated here.

In the present application, the thicknesses of the color resist and the black matrix in the first area, at the corresponding position of the light-transmitting area, of the color film substrate are smaller than the thicknesses of the color resist and the black matrix outside the first area, and the backlight module is provided with the through hole corresponding to the light-transmitting area, the photographing module is disposed corresponding to the through hole, so that external light rays can be obtained, thus under-screen photographing is achieved, and 100% full-screen design is satisfied.

The electronic device and the driving method therefor provided by the embodiments of the present application have been described in detail above. The principles and implementations of the present application are described with specific examples. The method of the application and its core idea; at the same time, for those skilled in the art, according to the idea of the present application, there will be changed in the specific embodiments and application scope. In summary, the content of this specification should not be construed as a limitation to the present application.

What is claimed is:

1. An electronic device, comprising:
    a liquid crystal module, having a light-transmitting area, the liquid crystal module comprising an upper polarizer, a color film substrate, a liquid crystal layer, an array substrate, and a lower polarizer from a top to a bottom in sequence, wherein thicknesses of color resist and a black matrix in a first area, at a corresponding position of the light-transmitting area, of the color film substrate are lower than thicknesses of color resist and a black matrix outside the first area, the thicknesses of the color resist and the black matrix of the first area is 10% to 60% of the thicknesses of the color resist and the black matrix outside the first area, a second area is disposed on the array substrate at a corresponding position of the light-transmitting area, and an area of the second area is smaller than an area of the first area;
    a backlight module, disposed below the liquid crystal module, the backlight module is defined with a through hole corresponding to the light-transmitting area, the area of the second area is larger than an area of the through hole; and
    a photographing module, disposed below the backlight module, the photographing module is disposed corresponding to the through hole, so that external light rays can be obtained by means of the through hole and the light-transmitting area.

2. The electronic device as claimed in claim 1, wherein the area of the second area is determined by a shooting angle of the photographing module and a size of an exposed lens.

3. The electronic device as claimed in claim 1, wherein the area of the first area is determined by a shooting angle of the photographing module and a size of an exposed lens.

4. The electronic device as claimed in claim 1, wherein the area of the through hole is determined by a shooting angle of the photographing module and a size of an exposed lens.

5. The electronic device as claimed in claim 1, wherein the electronic device further comprises a driver chip, and the driver chip is configured to prohibit power supply to a microelectronic circuit in the second area when the photographing module of the electronic device is called for shooting.

6. The electronic device as claimed in claim 5, wherein the driver chip is further configured to allow power supply to the microelectronic circuit in the second area when the photographing module is not called for shooting, the power supply to the microelectronic circuit in the second area is consistent with power supply to microelectronic circuit outside the second area.

7. An electronic device, comprising:
    a liquid crystal module, having a light-transmitting area, the liquid crystal module comprising an upper polarizer, a color film substrate, a liquid crystal layer, an array substrate, and a lower polarizer from a top to a bottom in sequence, wherein thicknesses of color resist and a black matrix in a first area, at a corresponding position of the light-transmitting area, of the color film substrate are lower than thicknesses of color resist and a black matrix outside the first area;
    a backlight module, disposed below the liquid crystal module, the backlight module is provided with a through hole corresponding to the light-transmitting area; and
    a photographing module, disposed below the backlight module, the photographing module is disposed corresponding to the through hole, so that external light rays can be obtained by means of the through hole and the light-transmitting area,
    wherein a second area is disposed on the array substrate at a corresponding position of the light-transmitting area, and an area of the second area is smaller than an area of the first area and larger than an area of the through hole.

8. The electronic device as claimed in claim 7, wherein the area of the second area is determined by a shooting angle of the photographing module and a size of an exposed lens.

9. The electronic device as claimed in claim 7, wherein the area of the first area is determined by a shooting angle of the photographing module and a size of an exposed lens.

10. The electronic device as claimed in claim 7, wherein the area of the through hole is determined by a shooting angle of the photographing module and a size of an exposed lens.

11. The electronic device as claimed in claim 7, wherein the electronic device further comprises a driver chip, and the driver chip is configured to prohibit power supply to a microelectronic circuit in the second area when the photographing module of the electronic device is called for shooting.

12. The electronic device as claimed in claim 11, wherein the driver chip is further configured to allow power supply to the microelectronic circuit in the second area when the photographing module is not called for shooting, the power supply to the microelectronic circuit in the second area is consistent with power supply to microelectronic circuit outside the second area.

13. A driving method for the electronic device as claimed in claim 7, comprising:
   prohibiting power supply to a microelectronic circuit in a second area by a driver chip in the liquid crystal module of the electronic device when the photographing module of the electronic device is called for shooting, wherein a position of the second area on the array substrate in the liquid crystal module is corresponding to the light-transmitting area in the liquid crystal module; and
   allowing power supply to the microelectronic circuit in the second area by the driver chip when the photographing module is not called for shooting, the power supply to the microelectronic circuit in the second area is consistent with power supply to microelectronic circuit outside the second area.

14. The driving method as claimed in claim 13, further comprising:
   measuring voltages on an upper side and a lower side of the liquid crystal molecules at positions of the liquid crystal layer in the liquid crystal module corresponding to the light-transmitting area when the photographing module is called for shooting, and obtain that the voltages are zero; and
   measuring the voltages on the upper side and the lower side of the liquid crystal molecules at the positions of the liquid crystal layer corresponding to the light-transmitting area when the photographing module is not called for shooting, and obtain that the voltages are not equal to zero.

15. The driving method as claimed in claim 13, wherein the second area is disposed on the array substrate at a corresponding position of the light-transmitting area, and an area of the second area is smaller than an area of the first area and larger than an area of the through hole.

16. The driving method as claimed in claim 13, wherein the thicknesses of the color resist and the black matrix of the first area is 10% to 60% of the thicknesses of the color resistance and the black matrix outside the first area.

17. An electronic device, comprising:
   a liquid crystal module, having a light-transmitting area, the liquid crystal module comprising an upper polarizer, a color film substrate, a liquid crystal layer, an array substrate, and a lower polarizer from a top to a bottom in sequence, wherein thicknesses of color resist and a black matrix in a first area, at a corresponding position of the light-transmitting area, of the color film substrate are lower than thicknesses of color resist and a black matrix outside the first area;
   a backlight module, disposed below the liquid crystal module, the backlight module is provided with a through hole corresponding to the light-transmitting area; and
   a photographing module, disposed below the backlight module, the photographing module is disposed corresponding to the through hole, so that external light rays can be obtained by means of the through hole and the light-transmitting area,
   wherein the thicknesses of the color resist and the black matrix of the first area is 10% to 60% of the thicknesses of the color resist and the black matrix outside the first area.

* * * * *